United States Patent
Tsai

(10) Patent No.: US 11,216,686 B2
(45) Date of Patent: Jan. 4, 2022

(54) ARTIFICIAL NEURAL NETWORK-BASED METHOD FOR DETECTING SURFACE PATTERN OF OBJECT

(71) Applicant: GETAC TECHNOLOGY CORPORATION, Hsinchu County (TW)

(72) Inventor: Kun-Yu Tsai, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 29 days.

(21) Appl. No.: 16/848,456

(22) Filed: Apr. 14, 2020

(65) Prior Publication Data
US 2020/0364888 A1 Nov. 19, 2020

Related U.S. Application Data

(60) Provisional application No. 62/848,216, filed on May 15, 2019.

(51) Int. Cl.
| | |
|---|---|
| *G06K 9/00* | (2006.01) |
| *G06K 9/46* | (2006.01) |
| *G06T 7/586* | (2017.01) |
| *G06T 7/00* | (2017.01) |
| *G06K 9/20* | (2006.01) |

(Continued)

(52) U.S. Cl.
CPC .......... *G06K 9/4661* (2013.01); *G01J 3/2823* (2013.01); *G01N 21/01* (2013.01); *G01N 21/3581* (2013.01); *G01N 21/8851* (2013.01); *G01N 21/952* (2013.01); *G01N 21/956* (2013.01); *G06F 17/16* (2013.01); *G06K 9/00201* (2013.01); *G06K 9/00208* (2013.01); *G06K 9/2018* (2013.01); *G06K 9/2054* (2013.01); *G06K 9/3208* (2013.01); *G06K 9/3233* (2013.01); *G06K 9/6257* (2013.01); *G06N 3/04* (2013.01); *G06N 3/0472* (2013.01); *G06N 3/063* (2013.01); *G06N 3/08* (2013.01); *G06T 7/0004* (2013.01); *G06T 7/11* (2017.01); *G06T 7/40* (2013.01); *G06T 7/45* (2017.01); *G06T 7/586* (2017.01); *G06T 7/97* (2017.01); *G01N 2021/8887* (2013.01); *G06T 2207/10152* (2013.01); *G06T 2207/20081* (2013.01); *G06T 2207/20084* (2013.01)

(58) Field of Classification Search
CPC ... G06T 7/11; G06T 7/40; G06T 2207/20084; G06N 3/0472; G06N 3/08
See application file for complete search history.

(56) References Cited

U.S. PATENT DOCUMENTS

| | | | | |
|---|---|---|---|---|
| 2010/0097457 | A1* | 4/2010 | Zhang | G06K 9/00798 348/119 |
| 2014/0010410 | A1* | 1/2014 | Sakurai | G06K 9/6267 382/103 |
| 2019/0065823 | A1* | 2/2019 | Srivastava | G06K 9/00214 |

FOREIGN PATENT DOCUMENTS

| | | | | |
|---|---|---|---|---|
| CN | 107169956 A | * | 9/2017 | G06K 9/4633 |

* cited by examiner

*Primary Examiner* — Ping Y Hsieh
*Assistant Examiner* — Xiao Liu

(57) ABSTRACT

An artificial neural network-based method for detecting a surface pattern of an object includes receiving a plurality of object images, dividing each object image into a plurality of image areas, designating at least one region of interest from the plurality of image areas of each of the object images, and performing deep learning with the at least one region of interest to build a predictive model for identifying a surface pattern of the object.

8 Claims, 7 Drawing Sheets

(51) Int. Cl.
*G06K 9/32* (2006.01)
*G06K 9/62* (2006.01)
*G06N 3/08* (2006.01)
*G01N 21/3581* (2014.01)
*G01N 21/88* (2006.01)
*G06T 7/40* (2017.01)
*G06N 3/04* (2006.01)
*G06T 7/11* (2017.01)
*G01J 3/28* (2006.01)
*G01N 21/956* (2006.01)
*G06T 7/45* (2017.01)
*G06F 17/16* (2006.01)
*G06N 3/063* (2006.01)
*G01N 21/01* (2006.01)
*G01N 21/952* (2006.01)

ARTIFICIAL NEURAL NETWORK-BASED METHOD FOR DETECTING SURFACE PATTERN OF OBJECT

CROSS-REFERENCE TO RELATED APPLICATIONS

This application claims priority from U.S. Patent Application Ser. No. 62/848,216, filed on May 15, 2019, the entire disclosure of which is hereby incorporated by reference.

BACKGROUND OF THE INVENTION

Field of the Invention

The present invention relates to an artificial neural network training system, and more particularly, to an artificial neural network-based method for detecting a surface pattern of an object.

Description of the Prior Art

Various safety protection measures are consisted of numerous small structural objects, such as safety belts. If these small structural objects have insufficient strength, safety concerns of protection effects of safety protection measures can be resulted.

Due to various reasons during a manufacturing process of these structural objects, such as impacts, fabrication errors and mold defects, minute defects such as slots, cracks, bumps and textures can be resulted on surfaces of these structural objects. These minute defects cannot be easily observed. One conventional defect detection method is manually inspecting a structural object under detection by naked eyes or by touching of hands, so as to determine whether the structural object contains defects, such as recesses, scratches, color differences or damages. However, manually inspecting whether a structural object contains defects yields less satisfactory efficiency, and has a greater probability of misjudgment, leading to the problem of an unmanageable yield rate of the structural object.

SUMMARY OF THE INVENTION

In one embodiment, an artificial neural network-based method for detecting a surface pattern of an object includes receiving a plurality of object images, dividing each of the object images into a plurality of image areas, designating at least one region of interest from the plurality of image areas of each of the object images, and performing deep learning with the at least one region of interest to build a predictive model for identifying the surface pattern of the object.

In conclusion, the artificial neural network-based method for detecting a surface pattern of an object according to an embodiment of the present invention is capable of flexibly performing training with respect to a specific region (a designated region of interest) of an object image to build a relatively accurate predictive model, thereby accelerating training time. In some embodiments, the artificial neural network-based method for detecting a surface pattern of an object according to an embodiment of the present invention is capable of directly performing prediction with respect to a specific region of an object image by further using the predictive model built to categorize a surface pattern of the specific region of the object image, thereby accelerating a preset time and hence achieving a lower miss rate.

DETAILED DESCRIPTION OF THE EMBODIMENTS

Figures 1, 2:
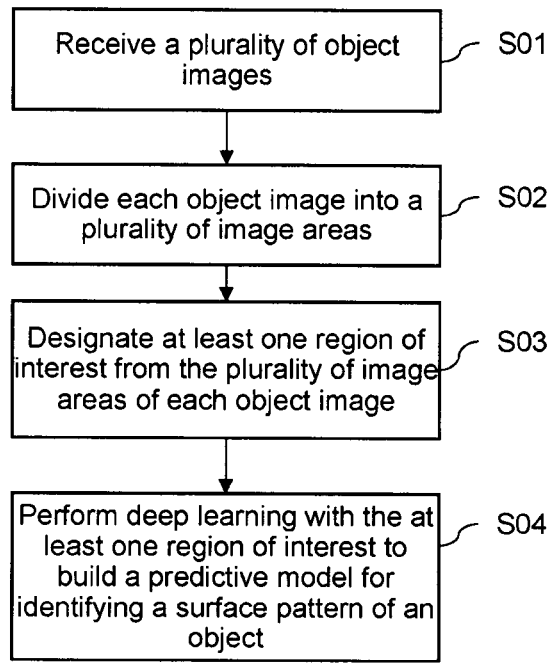
FIG. 1 is a flowchart of an artificial neural network-based method for detecting a surface pattern of an object according to an embodiment of the present invention.
FIG. 2 is a schematic diagram of an exemplary image area described in step S02 in FIG. 1.

Referring to FIG. 1, an artificial neural network-based method for detecting a surface pattern of an object is suitable for an artificial neural network system. The artificial neural network system has a learning (i.e., training) phase and a prediction phase.

In the learning phase, the artificial neural network system receives a plurality of object images (step S01). Herein, the plurality of object images are surfaces of the same relative positions of the same type of object. Furthermore, artificial neural network system receives the plurality of object images by using fixed imaging coordinate parameters.

Next, the artificial neural network system divides each of the object images into a plurality of image areas (step S02), and designates at least one region of interest from the plurality of image areas of each of the object images (step S03). In other words, after an object image is cut into a plurality of image areas, the artificial neural network system designates, according to a designation setting, an image area of a corresponding sequence among the plurality of image areas as a region of interest.

Then, the artificial neural network system performs deep learning (training) (equivalent to an artificial neural network which has not completed the training yet) with the designated region of interest so as to build a predictive model (equivalent to an artificial neural network which has completed the training) for identifying a surface pattern of the object (step S04). In some embodiments, the deep learning can be implemented by, for example but not limited to, a convolutional neural network (CNN) algorithm.

In some embodiments, the artificial neural network system can perform division, designation and training of each of the images one after another. In some other embodiments, the artificial neural network system can first perform division and designation of each of the object images, and then collectively perform training with all the designated regions of interest.

In some embodiments, the quantity of image areas generated from division of each of the object images is any integer greater than 2. Preferably, the image size of each image area can be less than or equal to 768*768 pixels, for example, 400*400 pixels, 416*416 pixels, and 608*608 pixels. Furthermore, the image sizes of the image areas are the same. In some embodiments, each image area is preferably a square. For example, assuming the image size of the object image is 3,000*4,000 pixels, the image size of the image areas after cutting can be 200*200 pixels.

In some embodiments of step S02, the artificial neural network system can first enlarge the object image according to a predetermined cutting size, such that the size of the object image is an integer multiple of the size of the image area. Then, the artificial neural network system cuts the enlarged object image into multiple image areas according to the predetermined cutting size. Herein, the image sizes of the individual image areas are the same, that is, all are equal to the predetermined cutting size.

For example, referring to FIG. 2, the artificial neural network system individually divides each object image IM received into 70 image areas A01 to A70 by a same cutting size. Then, the artificial neural network system designates the image areas A01 to A10 as regions of interest according to a predetermined designation setting (assuming that the designation setting is 1 to 10), so as to further perform deep learning with the image areas A01 to A10 (i.e., the regions of interest).

Figure 3:
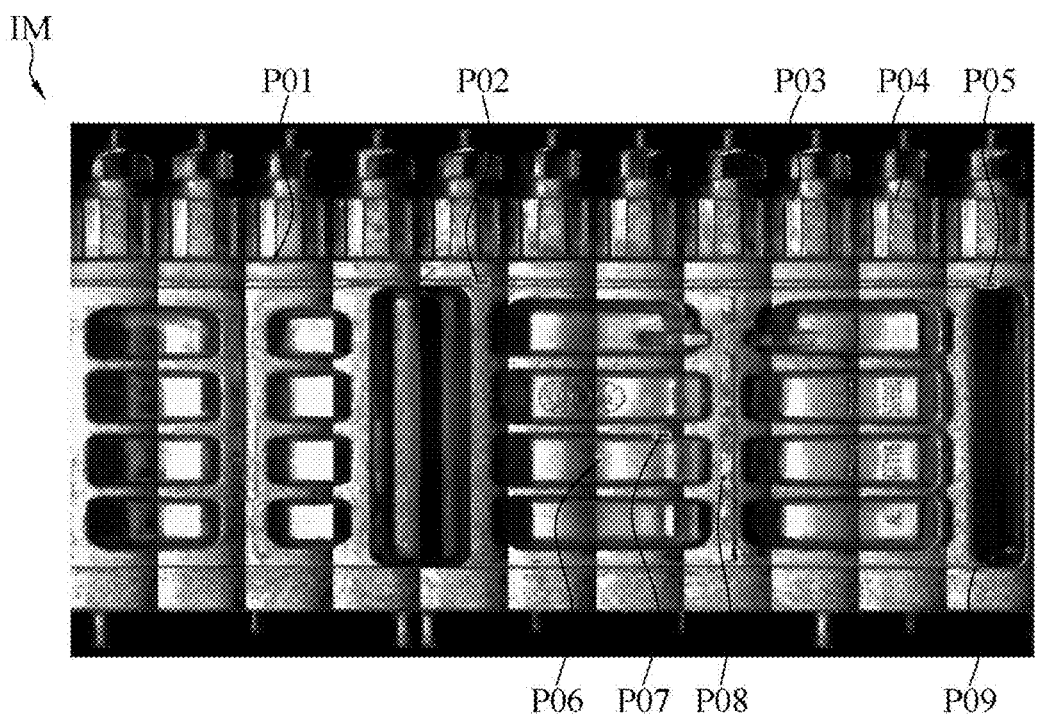
FIG. 3 is a schematic diagram of an exemplary object image described in step S01 in FIG. 1.

In some embodiments, the surface pattern can be, for example, surface structures such as slots, cracks, bumps, edges and textures. Wherein, each of the surface patterns is a three-dimensional fine structure. Herein, the three-dimensional fine structure is in a scale of submicron to micron (μm); that is, the longest side or the longest diameter of the three-dimensional fine structure is in a scale between submicron and micron. Wherein, submicron refers to <1 μm, e.g., 0.1 μm to 1 μm. For example, the three-dimensional fine structure is a micro-structure of 300 nm to 6 μm. Referring to FIG. 3, when the surface of the object has at least one surface pattern, partial images P01 to P09 of the surface pattern are also presented at corresponding image positions in the object image IM of the object.

In some embodiments, in the learning phase, the object images IM received by the artificial neural network system are known surface patterns, and surface pattern categories outputted by the artificial neural network system are also set in advance. In other words, each of the object images IM used for deep learning are all labeled with existing object types. In some embodiments, the label of the object type can present a label pattern on the object image IM (as shown in FIG. 3), and/or object information can be recorded in image information of the object image IM.

For instance, in one example, if an object is an unqualified object, the surface of the object has one or more surface patterns that the artificial neural network has already learned and attempts to capture, such that the artificial neural network then selects these surface patterns; conversely, if an object is a qualified object, the surface of the object does not possess any surface patterns that have been recorded and are used for triggering the selection action of the artificial neural network. At this point, some of the object images IM received by the artificial neural network system have labels of one or more surface patterns, and others have labels without any surface patterns. Furthermore, the output of the artificial neural network system sets in advance a plurality of surface pattern categories according to these surface patterns. In another example, if an object is an unqualified object, the surface of the object has one or more first-type surface patterns that the artificial neural network has already learned and attempts to capture; conversely, if an object is a qualified object, the surface of the object has one or more second-type surface patterns that the artificial neural network has already learned and attempts to capture, wherein the second-type surface pattern can be, for example, a standard surface pattern. At this point, some of the object images IM received by the artificial neural network system have category labels of one or more types of first-type surface patterns, and another part have category labels of one or more second-type surface patterns. Furthermore, the output of the artificial neural network system sets in advance a plurality of surface pattern categories according to these surface patterns.

In some embodiments, in the learning phase, the artificial neural network system performs training by using the object images IM with known surface patterns so as to generate determination items of the neurons in a predictive model and/or to adjust a weighting connecting any neurons, such that a prediction result (i.e., the surface pattern category outputted) of each object image IM conforms to the known and labeled as learned surface patterns, and a predictive model for identifying the surface pattern of an object can be built. In the prediction phase, the artificial neural network system performs category prediction on the object image IM of unknown surface patterns by using the predictive model built. In some embodiments, the artificial neural network system performs percentile prediction on the object image IM according to surface pattern categories, i.e., determining the percentage of possibility that each object image IM falls within the individual surface pattern categories.

In some embodiments, the region of interest can be an image area imaged from an area with sand holes of different depths, an image area imaged from an area without sand holes but having impact marks or scratches, an image area imaged from an area with different levels of surface roughness, an image area imaged from an area without surface defects, or an image area imaged from an area with defects of different aspect ratios. Herein, the artificial neural network system performs deep learning according to the regions of interest of said different surface patterns, so as to build a predictive model for identifying various surface patterns. In addition, the artificial neural network system can categorize regions of interest having different surface patterns so as to generate different predetermined surface pattern categories in advance.

For example, the artificial neural network system can use the regions of interest to identify that, sand holes and impact marks are imaged in the region of interest A01, no defects are imaged in the region of interest A02, only sand holes are imaged in the region of interest A33 and the level of surface roughness thereof is less than imaging of the level of surface roughness of the region of interest A35. Then, taking five categories as predetermined surface pattern categories for example, namely, having sand holes or air holes, having scratches or impact marks, having a high level of surface roughness, having a low level of surface roughness, and without any surface defects, the artificial neural network system can categorize the region of interest A01 to the predetermined category of having sand holes or air holes and the predetermined category of having scratches or impact marks, categorize the region of interest A02 to the predetermined category of being without any surface defects, categorize the region of interest A33 to the predetermined category of having sand holes or air holes and the predetermined category of having a low level of surface roughness, and categorize the region of interest A35 to the predetermined category of having a high level of surface roughness. Thus, by identifying different surface patterns using the artificial neural network system, the efficiency of surface pattern detection is significantly enhanced, and the probability of human misjudgment is also reduced.

In one embodiment of step S03, for each object image IM, the artificial neural network system designates a region of interest by changing the weighting of each image area. For instance, in continuation of the example above, referring to FIG. 2, after the object image IM is cut into multiple image areas A01 to A70, weightings of the multiple image areas A01 to A70 are initially set to 1. In one embodiment, assuming that the designation setting is 1 to 5, 33 to 38 and 66 to 70, the artificial neural network system increases the weightings of the image areas A1 to A5, A33 to A38 and A66 to A70 to 2 according to the predetermined designation setting, thereby designating the image areas A1 to A5, A33 to A38 and A66 to A70 as regions of interest. In one embodiment, when the weightings of the regions of interest are increased, the weightings of the other image areas A6 to A32 and A39 to A65 can be kept at 1. In another example, when the weightings of the regions of interest are increased, the artificial neural network system can at the same time decrease the weightings of the other image areas A6 to A32 and A39 to A65 to 0.

In another embodiment, assuming that the designation setting is 1 to 5, 33 to 38 and 66 to 70, the artificial neural network system decreases the weightings of the image areas A6 to A32 and A39 to A65 other than the image areas A1 to A5, A33 to A38 and A66 to A70 to 0 or 0.5 according to the predetermined designation setting, and keeps the weightings of the image areas A1 to A5, A33 to A38 and A66 to A70 at 1, thereby designating the image areas A1 to A5, A33 to A38 and A66 to A70 as regions of interest.

In one embodiment, the artificial neural network system includes an input layer and a multiple layers of hidden layers. The input layer is coupled to the hidden layers. The input layer is for performing steps S01 to S03 above. The hidden layers are for performing step S04 above. In another embodiment, the artificial neural network system includes a preprocessing unit and a neural network unit. The preprocessing unit is coupled to the neural network unit. The preprocessing unit is for performing steps S01 to S03 above. The neural network unit is for performing step S04 above. The neural network unit includes an input layer and multiple layers of hidden layers, and the input layer is coupled to the hidden layers.

Figure 4:
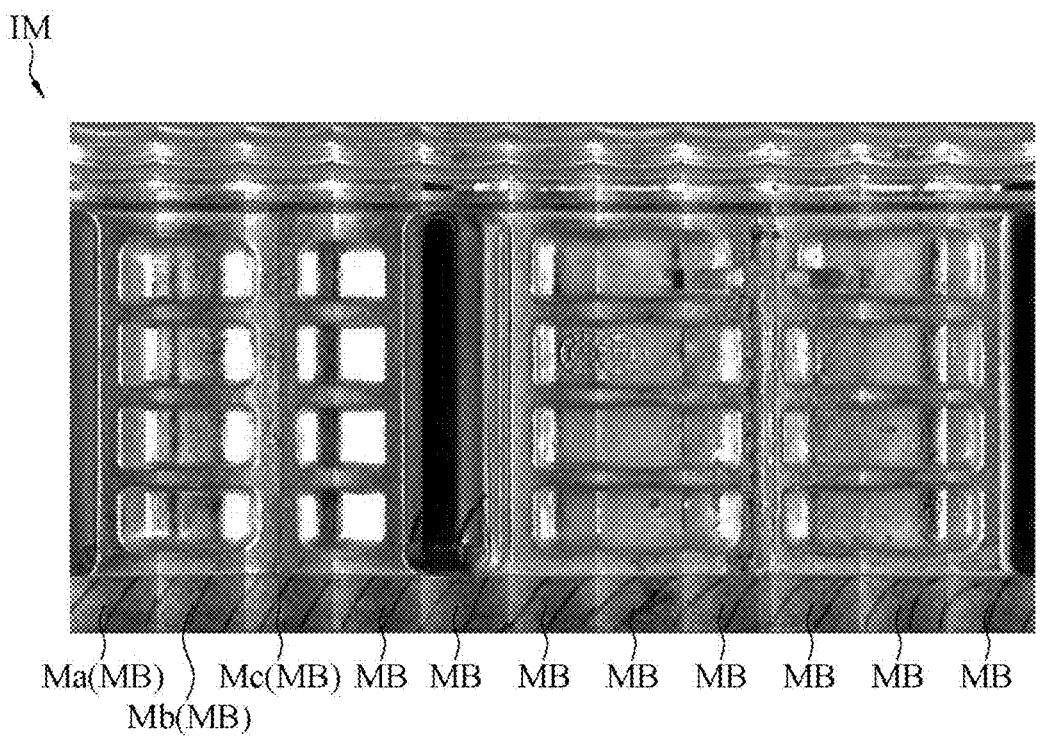
FIG. 4 is a schematic diagram of another exemplary object image described in step S01 in FIG. 1.

In some embodiments, each object image IM is formed by combining a plurality of detection images MB (as shown in FIG. 4), and the image size of the regions of interest is smaller than the image size (original image size) of the detection images.

In some embodiments, the detection images MB can be generated by an image scanning system for a surface pattern of an object. Referring to FIG. 5 to FIG. 8, an image scanning system for a surface pattern of an object is suitable for scanning an object 2 so as to obtain at least one detection image MB of the object 2. Herein, the object 2 has a surface 21, and the surface 21 of the object 2 is divided along an extension direction D1 of the surface 21 of the object 2 into a plurality of areas 21A to 21C. In some embodiments, assuming that the surface 21 of the object 2 is divided into nine areas for example, three exemplary areas 21A to 21C are denoted in the drawings. However, the present invention is not limited to the above example. The surface 21 of the object 2 can also be divided into areas of other quantities according to actual requirements, for example, any quantity such as 3, 5, 11, 15 or 20.

Figure 5:
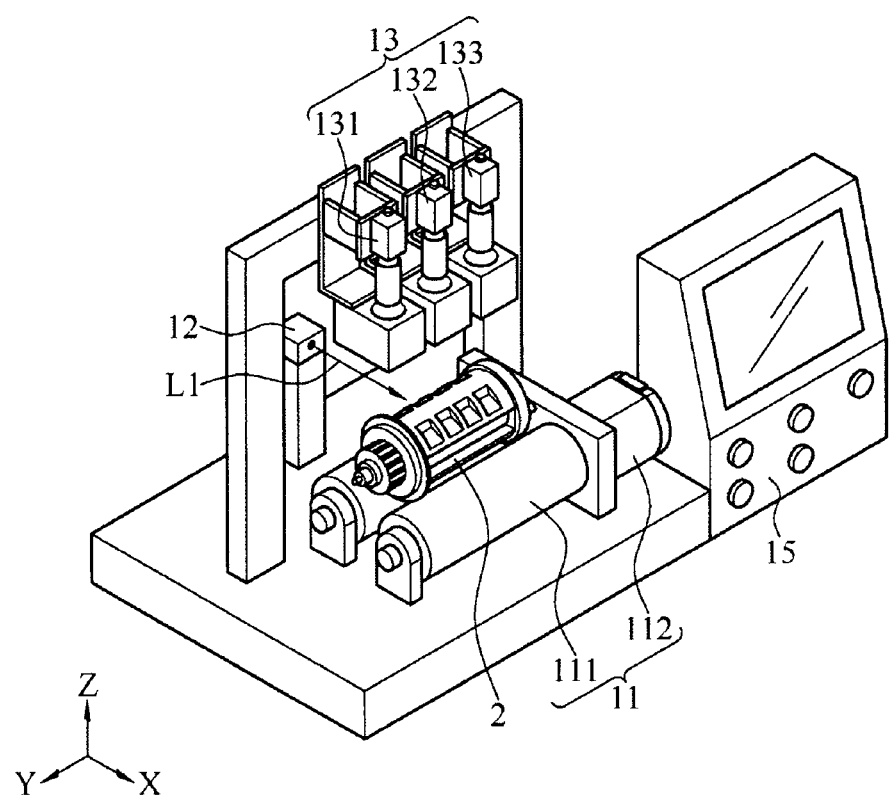
FIG. 5 is a schematic diagram of an image scanning system for a surface pattern of an object according to an embodiment of the present invention.

Referring to FIG. 5 to FIG. 8, FIG. 7 and FIG. 8 show schematic diagrams of two implementation forms of relative optical positions of the object 2, a light source component 12 and a photosensitive element 13 in FIG. 5.

An image scanning system for a surface pattern of an object includes a driver component 11, the light source component 12 and the photosensitive element 13. The light source component 12 and the photosensitive element 13 face a detection position 14 on the driver component 11 by different angles.

The image scanning system can perform a detection procedure. In the detection procedure, the driver component 11 carries the object 2 under detection and sequentially moves one of the plurality of areas 21A to 21C to the detection position 14, and at the same time the light source component 12 emits light L1 (to be referred to as detection light L1 hereinafter) toward the detection position 14, so as to sequentially illuminate the areas 21A to 21C located at the detection position 14. Thus, the areas 21A to 21C are sequentially provided at the detection position 14, and receive illumination of the light L1 from a lateral or inclined direction when they are located at the detection position 14.

In some embodiments, when each of the areas 21A to 21C is located at the detection position 14, the photosensitive element 13 receives diffused light generated by the light received on the areas currently located at the detection position 14, and captures, according to the diffused light received, detection images of the areas currently located at the detection position 14.

For example, in the detection procedure, the driver component 11 first moves the area 21A to the detection position 14, and the photosensitive element 13 captures, as the area 21A is illuminated by the detection light L1 provided by the light source component 12, a detection image Ma of the area 21A (as shown in FIG. 4). Next, the driver component 11 moves object 2 to locate the area 21B to the detection position 14, and the photosensitive element 13 captures, as the area 21B is illuminated by the detection light L1 provided by the light source component 12, a detection image Mb of the area 21B. Next, the driver component 11 moves the object 2 to locate the area 21C to the detection position 14, and the photosensitive element 13 captures, as the area 21C is illuminated by the detection light L1 provided by the light source component 12, a detection image Mc of the area 21C. The above is repeated similarly, until the detection images MB of all areas have been captured.

In some embodiments, an included angle (to be referred to as a light incident angle θ) between the incident direction of the light L1 and a normal line 14A of each of the areas 21A to 21C located at the detection position 14 is more than 0 degree and less than or equal to 90 degrees; That is to say, the light L1 (equivalent to the incident optical axis thereof) illuminates the detection position 14 with a light incident angle θ of being more than 0 degree and less than or equal to 90 degrees relative to the normal line 14A.

Figure 9:
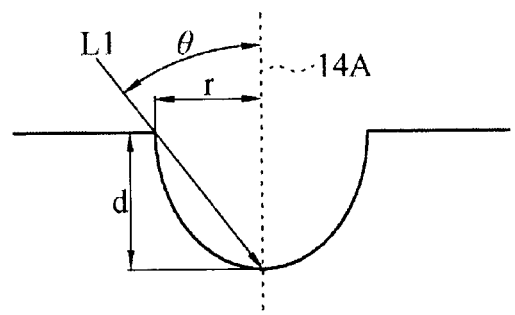
FIG. 9 is a schematic diagram of an implementation form of a surface pattern of the object in FIG. 7.

In some embodiments, the light incident angle θ can be more than a critical angle and less than or equal to 90 degrees, so as to achieve optimal effects of capturing target features under the wavelength of the light L1 to be used for detection. Herein, the critical angle can be associated with the surface pattern expected to be detected. In some embodiments, the light incident angle θ is associated with an aspect ratio of a surface pattern expected to be detected. Herein, the surface pattern expected to be detected can be a surface pattern having a minimum size among surface patterns expected to be detected by a user. In some embodiments, the critical angle can be an arctangent (r/d), where d is a hole depth of the surface pattern expected to be detected, and r is a hole radius of the surface pattern expected to be detected. For instance, referring to FIG. 9, assume that the surface pattern is a defect, and assume that the defect has a hole depth d and a hole radius r for example. Herein, the hole radius r is a distance between any lateral surface in the defect and the normal line 14A. A ratio of the hole radius r to the hole depth d (r/d) is the aspect ratio (r/d) of the defect. At this point, the light incident angle θ is more than or equal to the arctangent (r/d).

Figure 7:
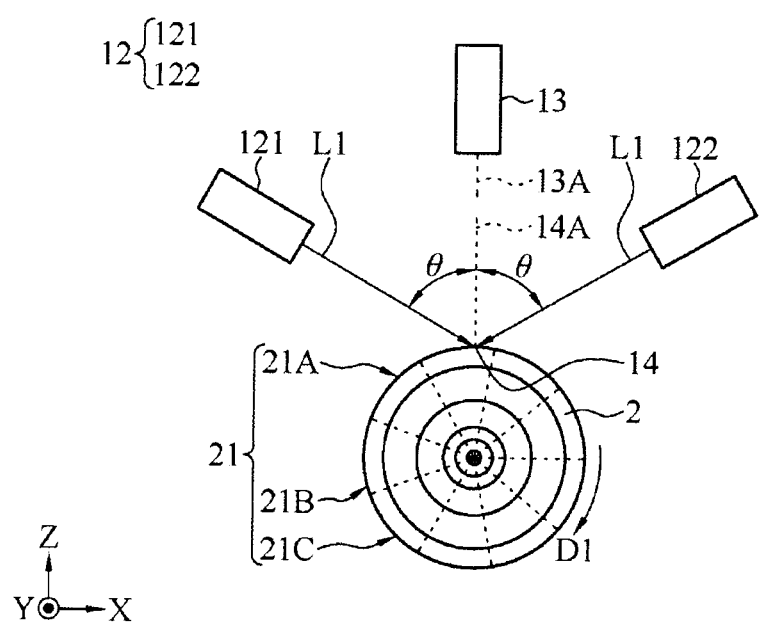
FIG. 7 is a schematic diagram of an implementation form of relative optical positions of the object, the light source component and the photosensitive element in FIG. 5.
Figure 8:
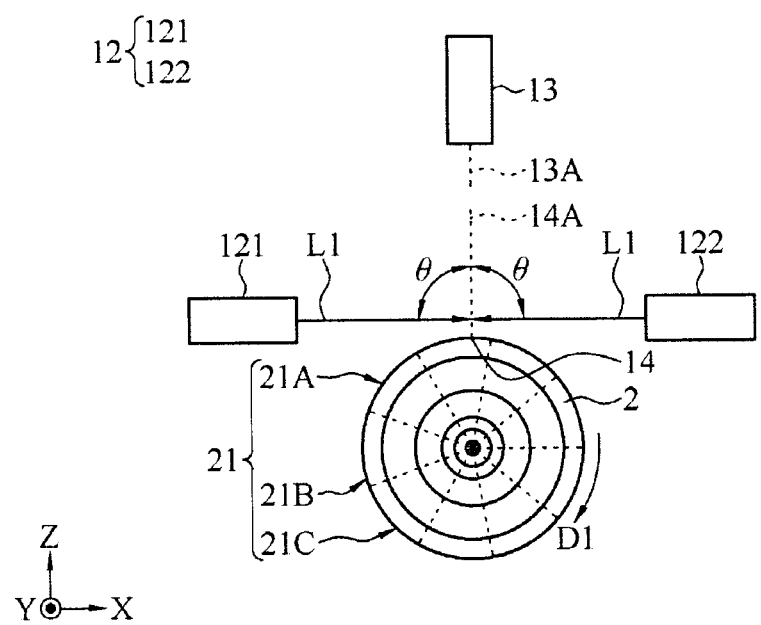
FIG. 8 is a schematic diagram of another implementation form of relative optical positions of the object, the light source component and the photosensitive element in FIG. 5.
Figure 10:
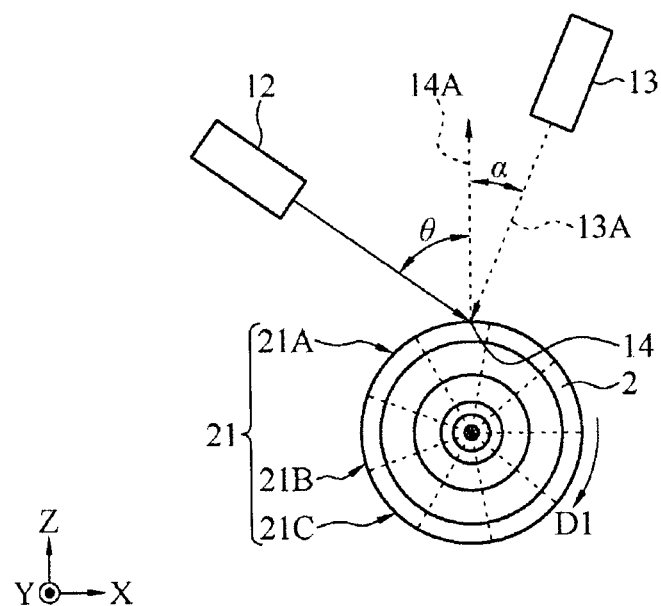
FIG. 10 is a schematic diagram of yet another implementation form of relative optical positions of the object, the light source component and the photosensitive element in FIG. 5.

In some embodiments, the photosensitive axis 13A of the photosensitive element 13 can be parallel to the normal line 14A or between the normal line 14A and the tangent of the area of the object 2 located at the detection position 14, as shown in FIG. 7, FIG. 8 and FIG. 10. In one example, the photosensitive axis 13A of the photosensitive element 13 is parallel to the normal line 14A, as shown in FIG. 7 and FIG. 8. In another example, the photosensitive axis 13A of the photosensitive element 13 and the normal line 14A have an included angle (to be referred to as a light reflection angle α hereinafter) therebetween, as shown in FIG. 10. In some embodiments, the light reflection angle α is not equal to the light incident angle θ, so as to minimize glare produced and to further obtain a clearer detection image MB.

In some embodiments, the light wavelength of the light L1 provided by the light source component 12 can range between 300 nm and 3,000 nm. For example, the light wavelength of the light L1 can be within a light waveband of 300 nm to 600 nm, 600 nm to 900 nm, 900 nm to 1,200 nm, 1,200 nm to 1,500 nm, 1,500 nm to 1,800 nm, or 1,800 nm to 2,100 nm.

In one example, the light L1 provided by the light source component 12 can be visible light, so as to form an image of a surface pattern in a scale of micron (μm) on the surface 21 in the detection image MB. Wherein, the light wavelength of the light L1 can range between 380 nm and 780 nm. For example, the light L1 can be white light having a light wavelength ranging between 380 nm and 780 nm, blue light having a light wavelength ranging between 450 nm and 475 nm, green light having a light wavelength ranging between 495 nm and 570 nm, or red light having a light wavelength ranging between 620 nm and 750 nm.

In one example, the light L1 provided by the light source component 12 can be far infrared light (for example, the light wavelength thereof ranges between 800 nm and 3,000 nm). Thus, the detection light can allow an image of a surface pattern in a scale of submicron (e.g., 300 nm) on the surface of the object 2 to form in the detection image.

In some embodiments, the light source component 12 can have a wider light waveband, and at this point, the image scanning system provides on a light incident path or a light absorbing path a spectroscopic component (not shown) allowing light of certain light wavebands to pass through to further generate the light L1 (or reflection light of the light L1) of a required light wavelength.

In some embodiments, again referring to FIG. 5 and FIG. 6, the driver component 11 includes a carrier element 111, and a driver motor 112 connected to the carrier element 111. In the detection procedure, the carrier element 111 carries the object 2, and the driver motor 112 drives the carrier element 111 so as to drive the object 2, thus aligning an area to the detection position 14. In one embodiment, as shown in FIG. 5, FIG. 7, FIG. 8 and FIG. 10, the object 2 is cylindrical in shape, such as a spindle. Herein, the surface 21 of the object 2 can be a lateral surface of the body of the object 2; that is, the surface 21 is a cylindrical surface and has a radian of 2πr. Herein, the extension direction D1 can be a clockwise direction or a counterclockwise direction with respect to the long axis of the body of the object 2 as a rotation axis. In some embodiments, one end of the object 2 is a narrower and smaller structure compared to the other end. In one example, the carrier element 111 can be two rollers spaced by a predetermined distance, and the driver motor 112 is coupled to rotating shafts of the two rollers. Herein, the predetermined distance is less than the diameter of the object 2 (the minimum diameter of the body). Thus, in the detection procedure, the object 2 can be movably arranged between the two rollers. Furthermore, while the driver motor 112 rotates the two rollers, the object 2 is driven and hence rotated by the two rollers due to the surface frictional force between the object 2 and the two rollers, such that the object 2 is rotated along the extension direction D1 of the surface 21 to align an area to the detection position 14. In another example, the carrier element 111 can be a rotating shaft, and the driver motor 112 is coupled to one end of the rotating shaft. At this point, the other end of the rotating shaft has an embedding member (e.g., an insertion hole). At this point, in the detection procedure, the object 2 is removably embedded in the embedding member. Furthermore, while the driver motor 112 rotates the rotating shaft, the object 2 is driven by the rotating shaft and is rotated along the extension direction D1 of the surface 21, thus aligning an area to the detection position 14. In some embodiments, assuming that the surface 21 is divided into nine areas 21A to 21C for example, the driver motor 112 drives the carrier element 111 to rotate by 40 degrees each time, such that the object 2 is driven to rotate along the extension direction D1 of the surface 21 by 40 degrees.

Figure 11:
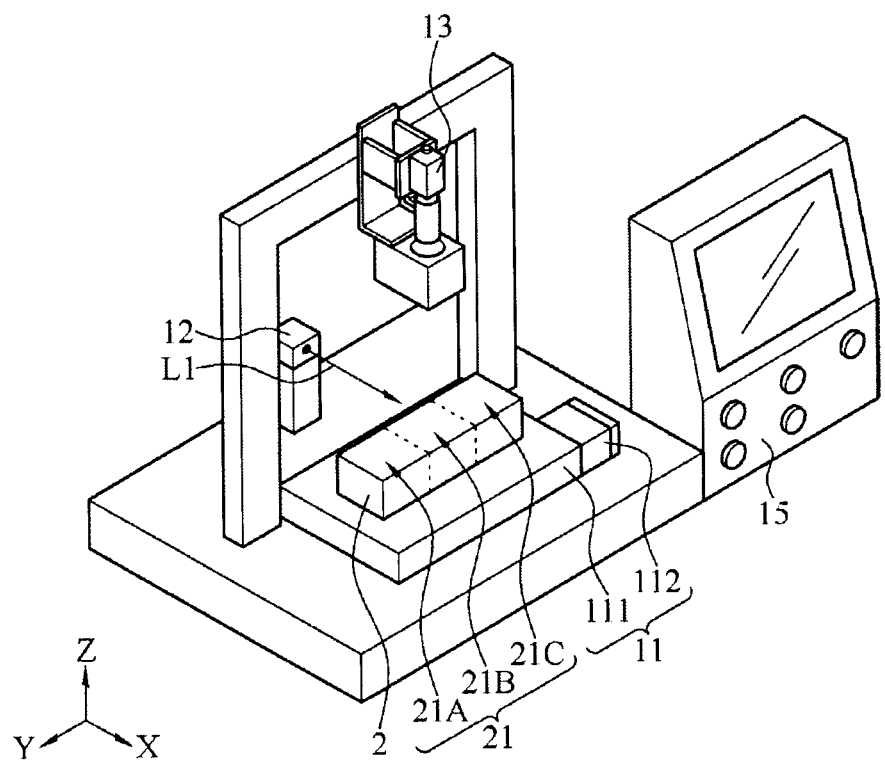
FIG. 11 is a schematic diagram of an image scanning system for a surface pattern of an object according to another embodiment of the present invention.

In one embodiment, as shown in FIG. 11, the object 2 is plate-like in shape. The surface 21 of the object 2 is a non-curved surface having a curvature of being equal to zero or approximately equal to zero. Herein, the extension direction D1 can be an extension direction of any side (e.g., the long side) of the surface 21 of the object 2. In one example, the carrier element 111 can be a planar carrier plate, and the driver motor 112 is coupled to one side of the planar carrier plate. At this point, in the detection procedure, the object 2 is removably arranged on the planar carrier plate. The driver motor 112 drives the planar carrier plate to move along the extension direction D1 of the surface 21 so as to drive and move the object 2, thus aligning an area to the detection position 14. Herein, the driver motor 112 drives the planar carrier plate to move by a predetermined distance each time, and sequentially moves each of the areas 21A to 21C to the detection position 14 by repeatedly driving the planar carrier plate to move. Herein, the predetermined distance is substantially equal to the width of each of the areas 21A to 21C along the extension direction D1.

In some embodiments, the driver motor 112 can be a step motor.

In one embodiment, as shown in FIG. 10, the light source component 12 can include a light emitting element. In another embodiment, as shown in FIG. 7 and FIG. 8, the light source component 12 can include two light emitting elements 121 and 122, and the two light emitting elements 121 and 122 are symmetrically arranged on two opposite sides of the object 2 relative to the normal line 14A. The two light emitting elements 121 and 122 respectively illuminate the detection position 14, and the surface 21 is illuminated by the symmetrical detection light L1 such that symmetrical diffused light is produced. Herein, the photosensitive element 13 captures the detection image MB of the area currently located at the detection position 14 according to the symmetrical diffused light, hence enhancing the imaging quality of the detection image MB.

In some embodiments, each of the light emitting elements 121 and 122 can be implemented by one or more light emitting diodes (LED); in some embodiments, each of the light emitting elements 121 and 122 can be implemented by a laser source.

Figure 6:
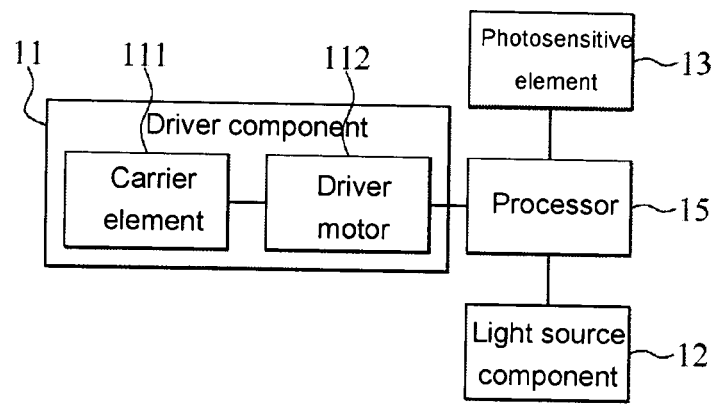
FIG. 6 is a functional schematic diagram of the image scanning system for a surface pattern of an object in FIG. 5.

In some embodiments, referring to FIG. 5, FIG. 6 and FIG. 11, the image scanning system for surface patterns of an object further includes a processor 15. The processor 15 is coupled to the light source component 12, the photosensitive element 13 and the driver motor 112, and is for controlling operations of the components (e.g., the light source component 12, the photosensitive element 13 and the driver motor 112).

In some embodiments, upon having captured the detection images MB of all the areas 21A to 21C by the photosensitive element 13, the processor 15 can further combine, according to the capturing sequence, the detection images MB captured into an object image IM.

In one embodiment, the photosensitive element 13 can be a linear photosensitive element, wherein the linear photosensitive element can be implemented by a linear image sensor. At this point, the detection images MB captured by the photosensitive element 13 can be combined without cropping by the processor 15.

Figure 12:
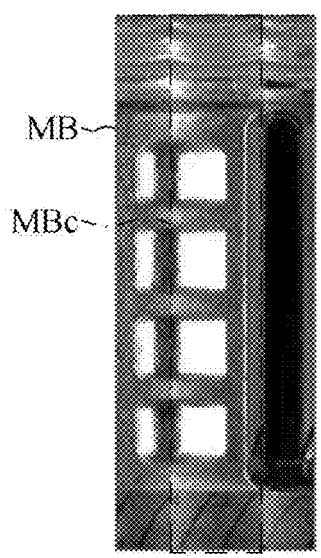
FIG. 12 is a schematic diagram of an exemplary detection image generated by an image scanning system for a surface pattern of an object.

In another embodiment, the photosensitive element 13 is a two-dimensional photosensitive element, wherein the two-dimensional photosensitive element can be implemented by a planar image sensor. At this point, upon having captured the detection images MB of all the areas 21A to 21C by the photosensitive element 13, the processor 15 captures, based on the short sides of the detection images MB, middle regions MBc of the detection images MB, as shown in FIG. 12. Then, the processor 15 combines the middle regions MBc corresponding to all the areas 21A to 21C into the object image IM.

In one embodiment, referring to FIG. 11, the image scanning system for a surface pattern of an object can be provided with one single photosensitive element 13, and the photosensitive element 13 performs image capturing on multiples areas 21A to 21C to obtain multiple detection images respectively corresponding to the areas 21A to 21C. In another embodiment, referring to FIG. 5, the image scanning system for a surface pattern of an object can be provided with multiple photosensitive elements 131 to 133, and each of the photosensitive elements 131 to 133 faces the detection position 14 and is arranged along the long axis of the object 2. The photosensitive elements 131 to 133 capture detection images of the area located at the detection position 14 for different sections of the object 2, respectively.

In an example, assume that the object 2 is cylindrical in shape and the image scanning system for a surface pattern of an object is provided with one single photosensitive element 13. The photosensitive element 13 can perform image capturing of multiple areas 21A to 21C of the body (i.e., the middle section) of the object 2 to obtain multiple detection images MB respectively corresponding to the areas 21A to 21C, and the processor 15 then combines the detection images MB of the areas 21A to 21C into the object image IM, as shown in FIG. 4.

Figure 13:
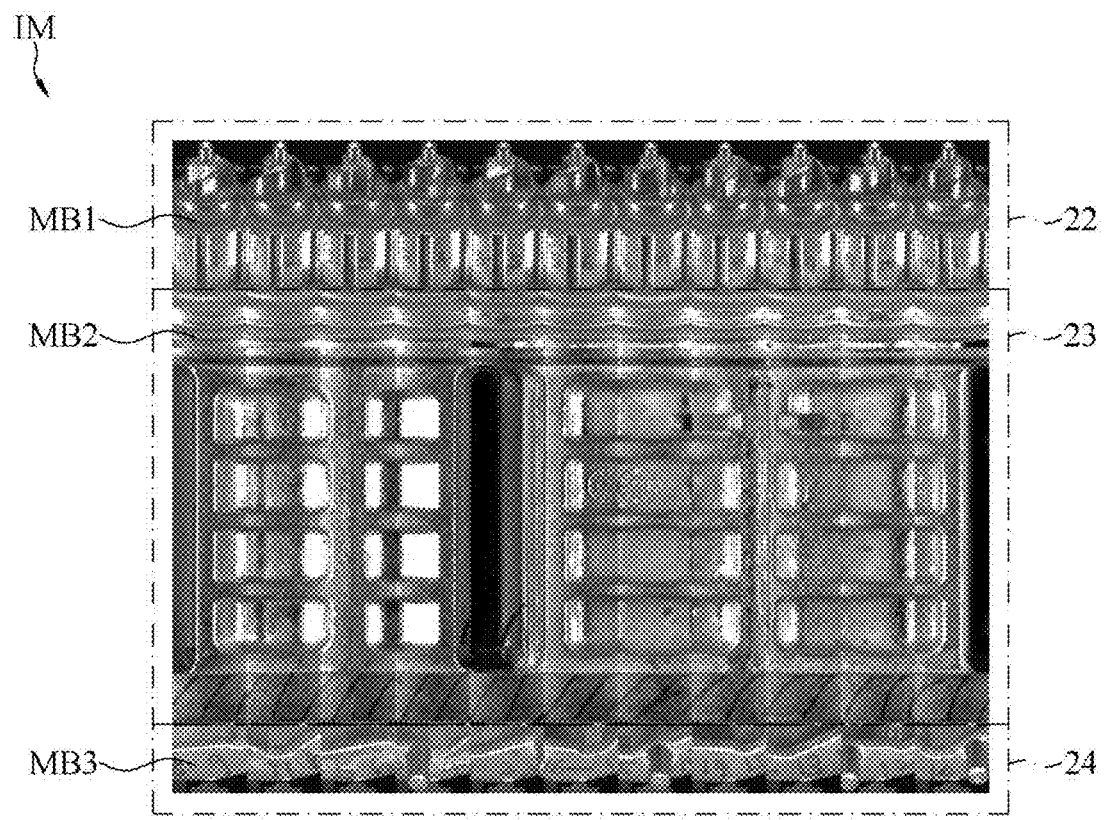
FIG. 13 is a schematic diagram of an exemplary object image generated by an image scanning system for a surface pattern of an object.

In another example, assume that the object 2 is cylindrical in shape and the image scanning system for a surface pattern of an object is provided with multiple photosensitive elements 131 to 133, as shown in FIG. 5. The photosensitive elements 131 to 133 respectively capture detection images MB1 to MB3 of different section positions of the surface of the object 2 located at the detection position 14, and the processor 15 then combines all the detection images MB1 to MB3 into the object image IM, as shown in FIG. 4. For example, assume that the photosensitive elements 131 to 133 are in a quantity of three, and the processor 15 combines the detection images MB1 to MB3 captured by the three photosensitive elements 131 to 133 into the object image IM of the object 2, as shown in FIG. 13. Wherein, the object image IM includes a sub object image 22 (the upper part of the object image IM in FIG. 13) combined from the detection images MB1 of all the areas 21A to 21C captured by the first photosensitive element 131 among the three photosensitive elements 13, a sub object image 23 (the middle part of the object image IM in FIG. 13) combined from the detection images MB2 of all the areas 21A to 21C captured by the second photosensitive element 132 among the three photosensitive elements 13, and a sub object image 24 (the lower part of the object image IM in FIG. 13) combined from the detection images MB3 of all the areas 21A to 21C captured by the third photosensitive element 133 among the three photosensitive elements 13.

In some embodiments, the processor 15 can include the foregoing artificial neural network system, so as to automatically perform surface pattern categorization according to the combined object image IM, thereby automatically determining the surface pattern of the surface 21 of the object 2. In other words, in the learning phase, the object image IM generated by the processor 15 can be subsequently used for training of the artificial neural network system, so as to build a predictive model for identifying a surface pattern of an object. In the prediction phase, the object image IM generated by the processor 15 can be subsequently used for prediction by the artificial neural network system, so as to perform category prediction on the object image IM by executing the predictive model.

In some embodiments, the object image IM generated by the processor 15 can be fed into another processor having the foregoing artificial neural network system, so as to have the artificial neural network system automatically perform surface pattern categorization according to the combined object image IM, thereby automatically determining the surface pattern of the surface 21 of the object 2. In other words, the artificial neural network system automatically performs training or prediction with respect to the object image IM fed thereto.

In some embodiments, the artificial neural network-based method for detecting a surface pattern of an object of the present invention can be implemented by a computer program product, such that the artificial neural network-based method for detecting a surface pattern of an object according to any one of the embodiments of the present invention can be completed when a computer (i.e., a processor) loads and executes the program. In some embodiments, the computer program product is a non-transitory computer-readable recording medium, and the program above is stored in the non-transitory computer-readable recording medium and to be loaded by a computer (i.e., a processor). In some embodiments, the program above itself can be a computer program product, and is transmitted by a wired or wireless means into a computer.

In conclusion, the artificial neural network-based method for detecting a surface pattern of an object according to an embodiment of the present invention is capable of flexibly performing training with respect to a specific region (a designated region of interest) of the object image IM to build a relatively accurate predictive model, thereby accelerating training time. In some embodiments, the artificial neural network-based method for detecting a surface pattern of an object according to an embodiment of the present invention is capable of directly performing prediction with respect to a specific region of the object image IM by further using the predictive model built to categorize a surface pattern of the specific region of the object image IM, thereby accelerating a preset time and hence achieving a lower miss rate. For example, the categorization prediction of the object image IM performed by using the predictive model built can provide a miss rate of approximating zero.

What is claimed is:

1. An artificial neural network-based method for detecting a surface pattern of an object, comprising:
   receiving a plurality of object images, wherein the plurality of object images are surfaces of the same relative positions of the same type of the object received using fixed imaging coordinate parameter;
   enlarging each of the object images to a predetermined cutting size;
   dividing each of the enlarged object images into a plurality of image areas:
   designating at least one region of interest from the plurality of image areas of each of the enlarged object images; and
   performing deep learning with the at least one region of interest of each of the object images to build a predictive model for identifying the surface pattern of the object.

2. The artificial neural network-based method for detecting a surface pattern of an object according to claim 1, wherein the step of designating the at least one region of interest from the plurality of image areas of each of the enlarged object images comprises:
   increasing a weighting of the at least one region of interest.

3. The artificial neural network-based method for detecting a surface pattern of an object according to claim 1, after the step of dividing each of the enlarged object images into the plurality of image areas, further comprising:
   decreasing a weighting of at least one image area among the plurality of image areas other than the at least one region of interest.

4. The artificial neural network-based method for detecting a surface pattern of an object according to claim 1, wherein the surface pattern identified by the predictive model is at least two of slots, cracks, bumps and textures.

5. The artificial neural network-based method for detecting a surface pattern of an object according to claim 1, wherein the deep learning is implemented by a convolutional neural network (CNN) algorithm.

6. The artificial neural network-based method for detecting a surface pattern of an object according to claim 1, wherein each of the object images is formed by combining a plurality of detection images, and each region of interest is smaller than the detection image.

7. The artificial neural network-based method for detecting a surface pattern of an object according to claim 1, wherein the step of performing the deep learning with the at least one region of interest comprises categorizing each region of interest according to a plurality of surface pattern categories.

8. The artificial neural network-based method for detecting a surface pattern of an object according to claim 1, wherein the image sizes of the individual image areas are the same.

\* \* \* \* \*